United States Patent [19]

Hirata

[11] Patent Number: 4,688,189

[45] Date of Patent: Aug. 18, 1987

[54] ELECTRONIC EQUIPMENT FOR STORING NUMBER OF SEARCHES OF INFORMATION

[75] Inventor: Osamu Hirata, Tokyo, Japan

[73] Assignee: Canon Kabushiki Kaisha, Tokyo, Japan

[21] Appl. No.: 830,255

[22] Filed: Feb. 18, 1986

Related U.S. Application Data

[63] Continuation of Ser. No. 352,263, Feb. 25, 1982, abandoned.

[30] Foreign Application Priority Data

Mar. 6, 1981 [JP] Japan .................. 56-30995

[51] Int. Cl.⁴ .............................................. G06F 9/00
[52] U.S. Cl. .............................................. 364/900
[58] Field of Search .............. 364/200, 900, 419; 434/169

[56] References Cited

U.S. PATENT DOCUMENTS

| | | | |
|---|---|---|---|
| 4,158,236 | 6/1979 | Levy | 364/900 |
| 4,159,536 | 6/1979 | Kehoe et al. | 364/900 |
| 4,192,006 | 3/1980 | Hausdorff | 364/900 |
| 4,218,760 | 8/1980 | Levy | 364/900 |
| 4,308,017 | 12/1981 | Laughon et al. | 434/169 |
| 4,339,806 | 7/1982 | Yoshida | 364/900 |

FOREIGN PATENT DOCUMENTS 2014765 8/1979 United Kingdom .

OTHER PUBLICATIONS

J S and A Products, Scientific American, Feb. 1979 "Language Translator" pp. 4-5.

Primary Examiner—Gareth D. Shaw
Assistant Examiner—John G. Mills
Attorney, Agent, or Firm—Fitzpatrick, Cella, Harper & Scinto

[57] ABSTRACT

An electronic device, such as an electronic learning machine or dictionary, includes a memory for storing items of information, such as words in both a first and a second language in pairs, and an operation unit for searching particular ones of the pairs of words. This device also includes a memory that stores the number of times each pair of words is searched. Each time a pair of words is searched, the total number of times that the pair has been searched is displayed in a recognizable form by a display.

3 Claims, 2 Drawing Figures

FIG. 2

| PROCEDURE | KEY OPERATION | DISPLAY STATE OF DISPLAY DEVICE |
|---|---|---|
| 1 | [A→B] [F] [L] [O] | A→B  FLO |
| 2 | [SEARCH] | A→B  FLOAT |
| 3 | [SEARCH] | A→B  FLOOR |
| 4 | [SEARCH] | A→B  FLOWER |
| 5 | [CHANGE] | A→B  ★ HANA |
| 6 | [B→A] [H] [A] [N] [A] | B→A  HANA |
| 7 | [CHANGE] | B→A  ★ ★ FLOWER |
| 8 | [CHANGE] | B→A  ★ ★ HANA |
| 9 | [A→B] [★] [★] [A] | A→B  ★ ★ A |
| 10 | [SEARCH] | A→B  ★ ★ ABANDON |
| 11 | [SEARCH] | A→B  ★ ★ ABIDE |
| 12 | [SEARCH] | A→B  ★ ★ ABOARD |

ELECTRONIC EQUIPMENT FOR STORING NUMBER OF SEARCHES OF INFORMATION

This application is a continuation of application Ser. No. 352,263 filed Feb. 25, 1982, now abandoned.

BACKGROUND OF THE INVENTION

1. Field of the Invention

The present invention relates to an electronic device, such as an electronic dictionary or learning machine, that stores a number of items of information and which has an additional function of automatically storing the number of times each item of information is searched.

2. Description of the Prior Art

Recent advances in integrated circuit (IC) technology are notable and especially important are increases in the capacity of read only memories (ROMS) and random access memories (RAMS). An application for these memories is in electronic learning devices or electronic dictionaries which require a large capacity to store a great amount of data.

SUMMARY OF THE INVENTION

It is an object of the present invention to provide an electronic device such as an electronic learning machine or dictionary which has a memory for storing a number of items of information and the number of times a search is made for every item of information, so that the number of searches already made, which is stored in this memory, can be displayed when the corresponding item of information is searched for again.

It is another object of the present invention to provide an electronic device of the kind mentioned which has a memory for storing the number of times a search is made for every item of information, so that each item of information can be searched on the basis of the number of searches for that item already made.

The above and other objects of the present invention will become apparent from the following description which will be made with reference to the accompanying drawings.

BRIEF DESCRIPTION OF THE DRAWINGS

FIG. 2 is a chart showing the mode of operation of the electronic device shown in FIG. 1.

DETAILED DESCRIPTION OF THE PREFERRED EMBODIMENT

Figure 1:
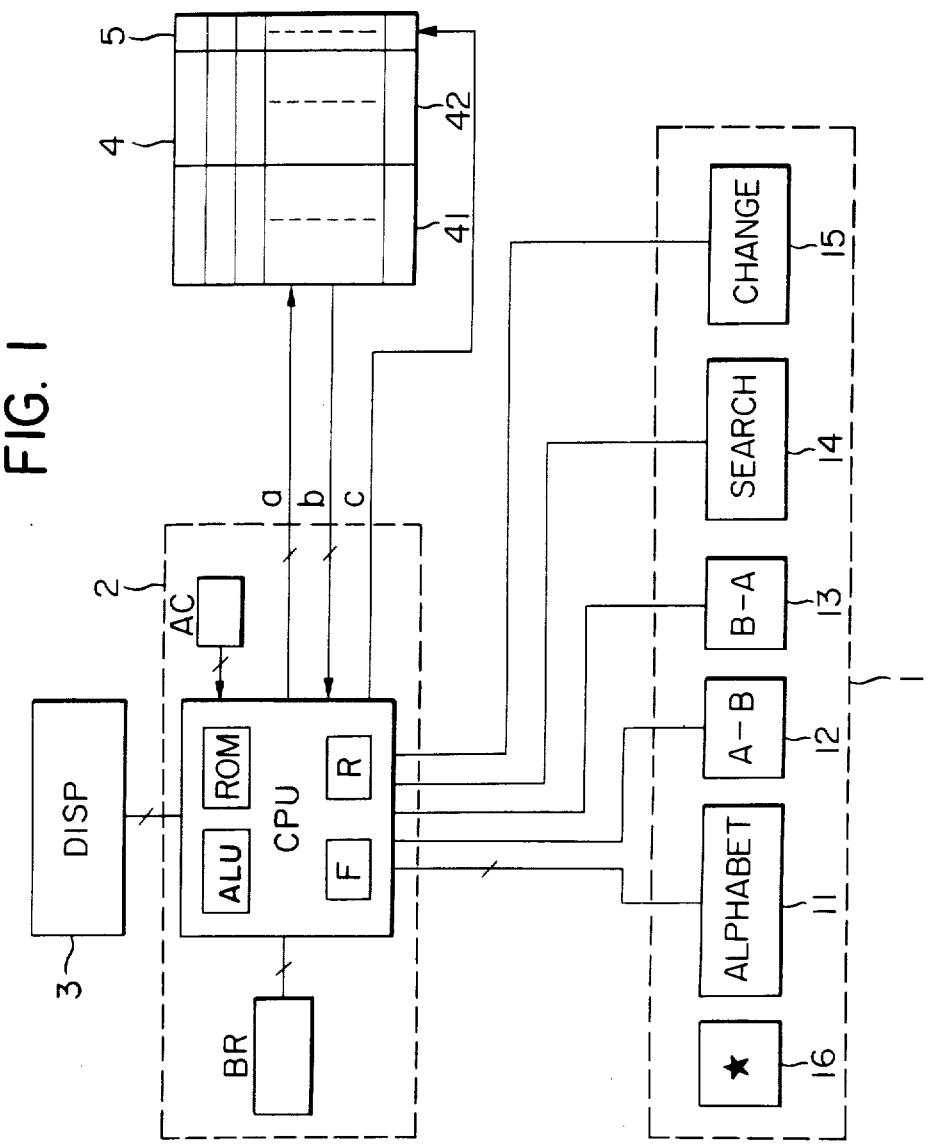
FIG. 1 is a block diagram of an electronic device, such as an electronic learning machine or dictionary according to an embodiment of the present invention.

The present invention will now be described in detail with reference to an embodiment of it as an English to Japanese or Japanese to English dictionary.

FIG. 1 is a block diagram showing an electronic device according to this embodiment of the present invention. Referring to FIG. 1, this embodiment includes a keyboard 1 which is an input means and has letter or alphabet keys 11 for inputting letters representing words in either Japanese or English, a English to Japanese conversion key $\boxed{A \rightarrow B}$ 12 for instructing the device to convert words input by the keys from English to Japanese, an Japanese to English conversion key $\boxed{B \rightarrow A}$ 13 for instructing the device to convert input words from Japanese to English, a $\boxed{SEARCH}$ key 14 for instructing the device to search for a word in a first language (e.g., Japanese) or a second language (e.g., English) so that a conversion to the other language can be made, a $\boxed{CHANGE}$ key 15 for executing the conversion instruction set by the English to Japanese conversion key $\boxed{A \rightarrow B}$ 12 or the Japanese to English conversion $\boxed{B \rightarrow A}$ key 13, and a key 16 for performing a search for words on the basis of the number of searches made.

This embodiment also includes an operating section 2 that has a central processing unit CPU comprising an arithmetic and logic unit ALU for performing operations and judgments in a well known manner, a control memory ROM for storing a control program or procedures to be described later and for storing the display patterns, a flag F for storing the input information needed by the ALU for performing judgments, a memory R, a register BR for storing data input through the keyboard 1, and an address counter AC for addressing information as described later.

The operating section is connected to the keyboard as shown in FIG. 1 and is also connected to a dictionary memory 4 having a first section 41 for storing English words and a second section 42 for storing corresponding Japanese words. The operating section is still further connected to a memory 5 having a plurality of storage locations, each corresponding to one associated pair of English and Japanese words and each for storing the number of times each such pair is searched. The memory R in the CPU temporarily stores the contents read from the memory 5 as will be described later.

Japanese and English words stored in the dictionary memory 4 may be addressed by the address counter AC under control of the ALU. As noted, the memory 5 stores the number of searches made for each item of information or word stored in the dictionary memory 4. One address from the address counter AC addresses a pair of items of information, namely a Japanese word and a corresponding English word stored in the dictionary memory 4 and the numbers of searches made for these items of information stored in the memory 5.

A display device DISP 3 also connected to the operating unit 2 stores for display the contents of the register BR, the dictionary memory 4, and the memory 5 during operation of the device as will be described below.

Referring still to FIG. 1, the operating section 2 and the memories 4 and 5 exchange a memory address signal a from the address counter AC, a data item signal b, representing the item of information or word addressed, and counter write information c for making current the number of searches made.

The mode of operation of the electronic equipment of the configuration as described above will now be described with reference to FIG. 2.

In this embodiment, characters representing either English or Japanese words may be input through the letter keys 11 of the keyboard 1. First, either the English to Japanese conversion key $\boxed{A \rightarrow B}$ 12 or the Japanese to English conversion key $\boxed{B \rightarrow A}$ 13 is depressed to set the mode of operation of the device for either conversion from English to Japanese or from Japanese to English. This mode, determined by the keys 12 and 13, is stored in the flag F in the operating section 2. For example, when the key $\boxed{A \rightarrow B}$ 12 is depressed, the flag F is set at logic state "1". On the other hand, when the key $\boxed{B \rightarrow A}$ is depressed, the flag F is set at logic state "0". Then either the initial part of or a complete word in the first language to be searched for translation into the second language and stored in sections 41 and 42 of memory 4 is input through the keyboard KB, and it is temporarily stored in the register BR. At the same time, this information, namely the input word or part thereof, is displayed by the display device DISP 3. Referring to FIG. 2, procedure 1 corresponds to the state of the device where the key 12 has been depressed and letters, F, L, and O have been input and are displayed. Further, in the example shown in FIG. 2, procedures 1 to 5 correspond to key operations for obtaining a Japanese translation of an English word, "FLOWER". First, as noted, the English to Japanese conversion key [A→B] 12 is depressed to set the mode for English to Japanese conversion. Next, letters "FLO" are input through the letter keys 11 by depressing keys [F], [L] and [O]. Information representing these characters is stored in the register BR under the control of the control memory ROM. When the [SEARCH] key 14 is depressed in procedure 2, the contents of the English word section 41 in the dictionary memory 4 are read sequentially by sequentially incrementing the count of the address counter AC under the control of the CPU. The information or words read sequentially from section 41 is compared with the word stored in the register BR by the arithmetic and logic unit ALU. Words starting with "FLO" are then loaded from the dictionary memory 4 into the display under control of the CPU.

Every time the [SEARCH] key is depressed, the loaded words are sequentially displayed.

In the examle shown in FIG. 2, first "FLOAT" is displayed. Then "FLOOR" is displayed, and, thereafter, "FLOWER" which is being searched is displayed. The [CHANGE] key 15 is depressed when the desired word is displayed, and information "HANA" is read out from the Japanese word section 42 of the dictionary memory as corresponding to the desired English word in section 41. The number of searches made for this pair of English and Japanese words is also obtained from the memory 5 which stores the number of searches made for every item of information, that is word, and is loaded into the display. In this embodiment, the number of searches is represented by the number of "*" symbols displayed by the display. Finally, each time a search for a word is made, "1" is added to the number of searches initially stored in the memory 5 and the addition result is stored at the same address of the memory 5 from which the previous number of searches has been read out all under the control of the CPU.

As may be easily understood, three items of information, namely a Japanese word, a corresponding English word and the number of searches made, are accessed from the memories 4 and 5 by one address. The Japanese and English words are stored in the dictionary memory 4. Since the number searches at each address need be updated when the address is searched, the memory 5 is an erasable memory, such as a RAM.

Procedures 6 and thereafter shown in FIG. 2 will now be described as if conducted after procedures 1 through 5. When the keys are depressed in the order of [B→A], [H], [A], [N], and [A], "HANA" is searched in the Japanese to English conversion mode as described above. When the [CHANGE] key 15 is depressed, the Japanese word section 42 stored in the dictionary memory 4 is searched. When "HANA" is found and the corresponding English word, "FLOWER", is obtained and displayed, the corresponding number of searches made which is stored in the memory 5 is accessed. Since "FLOWER", comprising one of the two words of the pair of Japanese and English words, has already been searched once in this example, two symbols "*" are displayed at this time (refer to the display state of the display device in procedure 7). When the [CHANGE] key 15 is depressed again at this time, the Japanese "HANA" is displayed again. However, the content of the memory 5 is not incremented upon this operation. In procedures 9 and thereafter, the search is made on the basis of the number of symbols "*". In procedure 9, keys are depressed in the order of [A→B], [*], [*], [A], and [SEARCH], a search is made for an English word with two symbols "*" which starts with "A" and which has already been searched twice. When no symbol "*" is input, all the words are involved in the search of the desired word. The symbol "*" is stored in the register BR which also stores the input characters. Searches are made for the number of depressions of the "*" key and for the input characters.

The above description has been made with reference to the case of a dictionary which allows search of an input word on the basis of the number of searches which have been made. However, it is also possible to design the dictionary so as to search the words which have been searched twice or more, or the words which have not been searched. In this case, it is better that the number of searches is not incremented even if the CHANGE key is depressed. It is also possible to allow counting of the number of searches made up to three times and to stop counting the number of searches thereafter. Although the above embodiment is described with reference to the case of an English to Japanese or Japanese to English dictionary, the present invention is also applicable to dictionaries of other languages. The number of searches may be displayed by "*" or by other symbols or numbers. It is also possible to flash the word to indicate that this word has been searched three times or more.

I claim:

1. An electronic device for searching information stored therein comprising:

first memory means for storing a plurality of words of information;

means for entering words of search information into said device;

searching means connected to said entering means and to said first memory means for searching at least once for a desired word of information of said plurality of words of information;

second memory means connected to said searching means for storing a number of times each said desired word of information is searched by said searching means;

incrementing means, connected to said searching means and to said second memory means and being responsive to operation of said searching means to search for each said desired word of information, for incrementing the number of times searches are made for each said desired word of information stored in said second memory means;

said searching means searching for said desired word of information on the basis of at least one word of search information enterred by said entering means, and on the basis of said stored number corresponding to the number of times said desired word of information has been searched;

visualizing means coupled to said searching means and to said first memory means for visualizing said desired word of information; and entering means for entering at least one word of information for search by said searching means and an anticipated number of searches for said desired word of information for search.

2. An electronic device for searching information stored therein comprising:
   memory means having a first area for storing a plurality of words of information, and having a second area;
   first searching means connected to said memory means for searching said first area at least once for a desired word of information of said plurality of words of information, wherein said second area of said memory means stores a number of times each said desired word of information is searched by said first searching means;
   incrementing means connected to said first searching means and to said second area of said memory means and being responsive to operation of said first searching means to search for said desired word of information for incrementing the number of times searches are made for said desired word of information stored in said second memory means;
   second searching means, connected to said first area and said second area of said memory means, for searching for a desired word of information of said plurality of words of information on the basis of said stored number corresponding to the number of times said desired word has been searched;
   means for visually displaying the number of times each said desired word of information has been searched by said first searching means, stored in said second area of said memory means, said visually displaying means being operative to display the number of times as aforesaid in response to each search for said desired word of information by said first searching means; and
   incrementing means, responsive to operation of said searching means for said desired word of information, for incrementing the number of searches made for said desired word of information stored in said second area of said memory means.

3. An electronic device for searching information stored therein according to claim 2, further comprising entering means for entering information for searching said desired word of information by said first searching means.

* * * * *

UNITED STATES PATENT AND TRADEMARK OFFICE
CERTIFICATE OF CORRECTION

PATENT NO. : 4,688,189  
DATED : August 18, 1987  
INVENTOR(S) : OSAMU HIRATA

Page 1 of 2

It is certified that error appears in the above-identified patent and that said Letters Patent is hereby corrected as shown below:

COLUMN 1

Line 62, "a" should read --an--.  
Line 63, "$\overline{A \rightarrow B}$ 12" should read --$\boxed{A \rightarrow B}$ 12--.  
Line 65, "an" should read --a--.

COLUMN 2

Lines 3-4, "$\overline{\text{CHANGE}}$ instruction" should read --$\boxed{\text{CHANGE}}$ instruction--.  
Line 64, ""0"." should read --"0".--.

COLUMN 3

Line 28, "examle" should read --example--.  
Line 52, "number searches" should read --number of searches--.

UNITED STATES PATENT AND TRADEMARK OFFICE
CERTIFICATE OF CORRECTION

PATENT NO. : 4,688,189

DATED : August 18, 1987

INVENTOR(S) : OSAMU HIRATA

It is certified that error appears in the above-identified patent and that said Letters Patent is hereby corrected as shown below:

COLUMN 4

Line 2, "CHANGE" should read --CHANGE--.
Line 25, "CHANGE" should read --CHANGE--.
Line 60, "enterred" should read --entered--.

COLUMN 6

Line 14, "searching" should read --second searching--.

Signed and Sealed this

Thirty-first Day of May, 1988

Attest:

DONALD J. QUIGG

Attesting Officer

Commissioner of Patents and Trademarks